(12) United States Patent
Kashiwagi et al.

(10) Patent No.: US 8,743,113 B2
(45) Date of Patent: Jun. 3, 2014

(54) STEREOSCOPIC IMAGE DISPLAY APPARATUS

(75) Inventors: Masako Kashiwagi, Yokohama (JP); Tatsuo Saishu, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/409,933

(22) Filed: Mar. 1, 2012

(65) Prior Publication Data

US 2012/0200562 A1 Aug. 9, 2012

Related U.S. Application Data (63) Continuation of application No. PCT/JP2009/066150, filed on Sep. 16, 2009.

(51) Int. Cl.
*G06T 15/00* (2011.01)
*G09G 5/14* (2006.01)

(52) U.S. Cl.
USPC .............................. 345/419; 352/57; 355/22

(58) Field of Classification Search
CPC ........... G06T 15/00; G06T 15/50; G09G 5/14
USPC ......... 345/419; 352/57; 355/22; 348/E13.026
See application file for complete search history.

(56) References Cited

U.S. PATENT DOCUMENTS

| | | | |
|---|---|---|---|
| 5,349,379 A * | 9/1994 | Eichenlaub ..................... | 348/59 |
| 6,064,424 A * | 5/2000 | van Berkel et al. ............. | 348/51 |
| 7,425,951 B2 * | 9/2008 | Fukushima et al. .......... | 345/419 |
| 2008/0079662 A1 | 4/2008 | Saishu et al. | |
| 2009/0002262 A1 | 1/2009 | Fukushima et al. | |
| 2009/0009451 A1 | 1/2009 | Hamagishi | |
| 2009/0079818 A1 | 3/2009 | Saishu et al. | |
| 2011/0043615 A1 * | 2/2011 | Saishu et al. .................... | 348/51 |

FOREIGN PATENT DOCUMENTS

| | | |
|---|---|---|
| JP | 2005-62867 | 3/2005 |
| JP | 2007-17634 | 1/2007 |
| JP | 4010564 | 9/2007 |
| JP | 2008-249887 | 10/2008 |

(Continued)

OTHER PUBLICATIONS

International Search Report from Japanese Patent Office for International Application No. PCT/JP2009/066150, mailed Oct. 27, 2009.

(Continued)

*Primary Examiner* — Kimbinh T Nguyen
(74) *Attorney, Agent, or Firm* — Finnegan, Henderson, Farabow, Garrett & Dunner, L.L.P.

(57) ABSTRACT

A stereoscopic image display apparatus according an embodiment includes: an elemental image display unit having a display face in which pixels having sub-pixels are arranged in a matrix form, the display face being divided into a plurality of elemental images for display; and an optical plate provided on a viewer side of the elemental image display unit, the optical plate having a plurality of lenses arranged periodically with respect to the display face to be respectively associated with the plurality of elemental images, each of the lenses controlling light rays from the pixels which display an associated elemental image. In each lens, the sub-pixels which display an elemental image associated with the lens differing in isolation degree between adjacent sub-pixels depending upon whether a location is in a central portion of the lens or in a peripheral portion of the lens.

3 Claims, 11 Drawing Sheets

(56) References Cited

FOREIGN PATENT DOCUMENTS

| | | |
|---|---|---|
| JP | 4197716 | 10/2008 |
| JP | 2009-14996 | 1/2009 |
| JP | 2009-80144 | 4/2009 |
| WO | WO 2008/100826 A1 | 8/2008 |

OTHER PUBLICATIONS

International Preliminary Report on Patentability and Written Opinion issued by the International Bureau of WIPO on Apr. 11, 2012, for International Application No. PCT/JP2009/066150.

* cited by examiner

STEREOSCOPIC IMAGE DISPLAY APPARATUS

CROSS-REFERENCE TO RELATED APPLICATION

This application is a continuation of international application no. PCT/JP2009/066150 filed on Sep. 16, 2009 in Japan, the entire contents of which are incorporated herein by reference.

FIELD

Embodiments described herein relate generally to a stereoscopic image display apparatus.

BACKGROUND

As for the stereoscopic image display apparatus capable of displaying a stereoscopic moving picture, which is the so-called three-dimensional display, various schemes are known. Especially, in recent years, a stereoscopic image display scheme which is the flat panel type, which does not need dedicated glasses or the like, and which generates parallax in a viewer by controlling light rays supplied from a display panel having fixed pixel positions in a plane display apparatus, with an optical plate is known. As the plane display apparatus, a liquid crystal display apparatus, a plasma display apparatus or the like of direct view type or projection type is used.

The optical plate (called parallax barrier as well) controls light rays to make different images visible according to the angle even in the same position on the optical plate. For example, when giving the lateral disparity (horizontal disparity), a lenticular sheet (cylindrical lens array) is used. When giving also the up-and-down disparity (vertical disparity), a lens array is used. In addition, the schemes using the optical plate are classified into the binocular scheme, multiview scheme, supermultiview scheme (supermultiview condition of the multiview scheme), and integral photography (hereafter referred to as IP as well).

Use of the lens sometimes expands a pixel part including an wiring pattern in the liquid crystal display apparatus and causes unevenness of brightness and darkness of luminance (moiré). In order to solve this problem, a method of providing a pixel overlapping part between adjacent sub-pixels by providing each pixel with a shape of a parallelogram or "<" is proposed.

If a pixel overlapping part is provided between adjacent sub-pixels, however, the parallax crosstalk quantity which makes it possible to visually recognize a plurality of parallax images becomes greater than a definite quantity in some cases. In this case, a double image or defocusing feeling becomes unallowable and it appears as a display obstruction sometimes. In addition, aberration is unavoidable from the lens characteristics. As the number of parallaxes increases and the viewing zone becomes wide, the parallax crosstalk quantity in the central portion of the lens differs from that in the peripheral portion. And if it is attempted to decrease the parallax crosstalk quantity in the lens central portion, the parallax crosstalk quantity in the peripheral portion increases. On the other hand, if it is attempted to decrease the parallax in the lens peripheral portion, the parallax crosstalk quantity in the central portion increases. In other words, the parallax crosstalk quantity in the lens central portion and that in the peripheral portion are in a trade-off relation.

According to the conventional art, it is impossible in a multi-parallax wide viewing zone stereoscopic display apparatus of lens type to generally reduce the difference in parallax crosstalk quantity between the lens central portion and the peripheral portion in this way.

DETAILED DESCRIPTION

A stereoscopic image display apparatus according to an embodiment includes: an elemental image display unit having a display face in which pixels having sub-pixels are arranged in a matrix form, the display face being divided into a plurality of elemental images for display; and an optical plate provided on a viewer side of the elemental image display unit, the optical plate having a plurality of lenses arranged periodically with respect to the display face to be respectively associated with the plurality of elemental images, each of the lenses controlling light rays from the pixels which display an associated elemental image. In each lens, the sub-pixels which display an elemental image associated with the lens differing in isolation degree between adjacent sub-pixels depending upon whether a location is in a central portion of the lens or in a peripheral portion of the lens.

Hereafter, embodiments will be described in detail with reference to the drawings.

Figure 1:
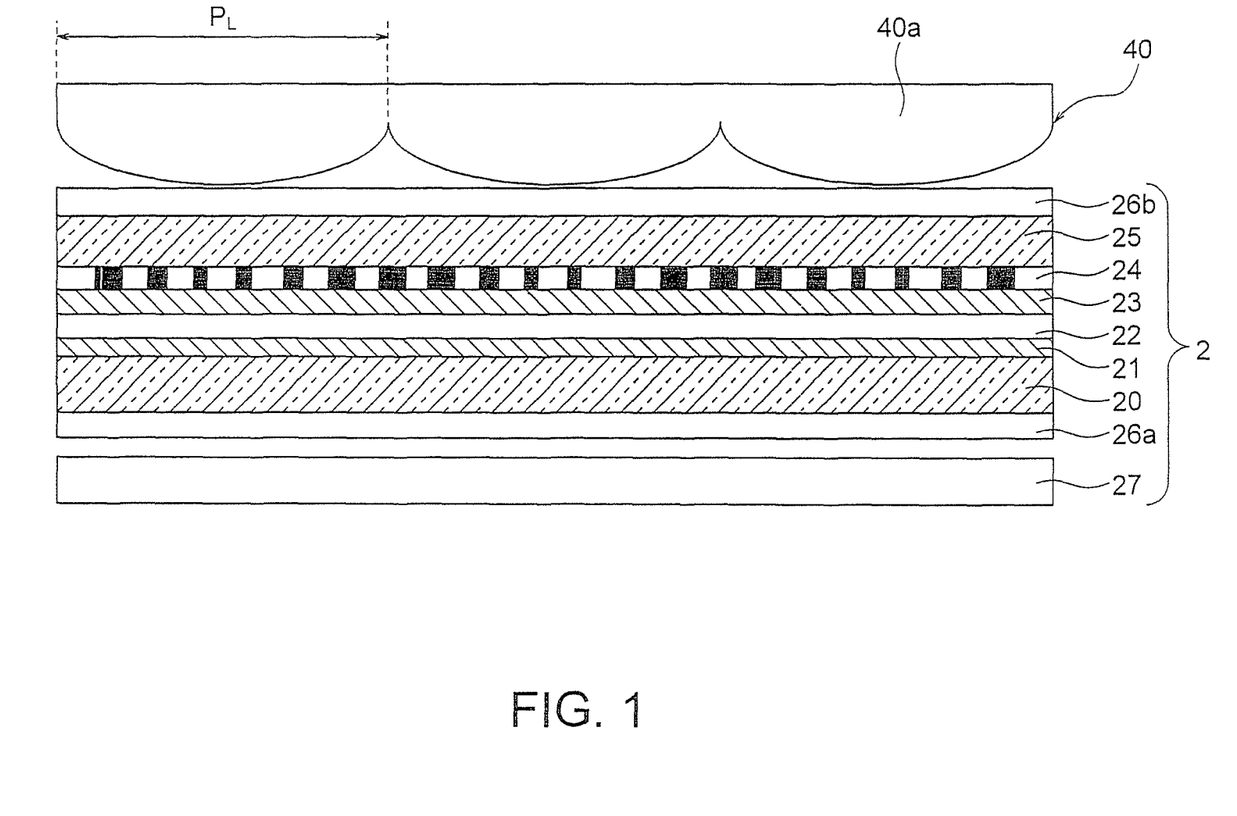
FIG. 1 is a horizontal section view of a stereoscopic image display apparatus according to an embodiment.

A stereoscopic image display apparatus according to an embodiment is shown in FIG. 1. FIG. 1 is a horizontal section view of a stereoscopic image display apparatus according to the present embodiment. The stereoscopic image display apparatus according to the present embodiment includes an elemental image display unit 2 and a parallax generating lens 40 which functions as an optical plate for generating a parallax in left and right eyes of a viewer. In the present embodiment, the parallax generating lens 40 is a cylindrical lens array. The cylindrical lens array 40 has a configuration in which a plurality of cylindrical lenses 40a each having a major axis extending in a vertical direction (a direction perpendicular to paper) are arranged in a horizontal direction (a direction parallel to the paper). The cylindrical lenses 40a have a pitch $P_L$. The elemental image display unit 2 displays images (elemental images) associated with respective cylindrical lenses 40a. In the present embodiment, a liquid crystal panel is used as the elemental image display unit 2. The elemental image display unit 2 includes a first transparent substrate 20 using, for example, a glass substrate, a first transparent electrode 21 provided on the first transparent substrate 20 and having a plurality of wiring patterns, a second transparent electrode 23 provided over the first transparent electrode 21 and having a plurality of wiring patterns, a liquid crystal layer 22 interposed between the first transparent electrode 21 and the second transparent electrode 23, and a sub-pixel unit 24 provided on the second transparent electrode 23 and having R (red), G (green) and B (blue) color filters arranged in an array form, a second transparent substrate 25 provided on the sub-pixel unit 24 and using, for example, a glass substrate, a first sheet polarizer 26a provided on an opposite side of the first transparent substrate 20 from the first transparent electrode 21, a second sheet polarizer 26b provided on an opposite side of the second transparent substrate 25 from the sub-pixel unit 24, and a back light 27 which is provided on an opposite side of the first sheet polarizer 26a from the first transparent substrate 20 and which emits light. In the liquid crystal layer 22, initial orientations of liquid crystal molecules are aligned in one direction. The first and second sheet polarizers 26a and 26b are constituted to transmit light vibrating respectively in predetermined directions in which directions of transmitted light (polarized directions) are perpendicular to each other.

In the present embodiment, a cylindrical lens array is used as the parallax generating lens 40. However, a fly eye lens can be used. The lens convex part of the parallax generating lens 40 can be located on either of the elemental image display unit 2 side and the viewer side (opposite side of the parallax generating lens 40 from the elemental image display unit 2). In a structure having a wide viewing zone, however, it is desirable that the lens convex part of the parallax generating lens 40 is located on the elemental image display unit side.

The elemental image display unit 2 can be a display apparatus of self light emitting type, for example, a display apparatus such as an organic EL panel, a plasma display apparatus, or a field emission type display apparatus. Incidentally, in such a display apparatus of self light emitting type, it is not necessary to provide a back light.

As the first and second sheet polarizers 26a and 26b, linearly sheet polarizers, circularly sheet polarizers, elliptically sheet polarizers, or the like can be used. The back light 27 may be a typical fluorescent tube, a LED back light, or a combination of a light guiding panel and a diffuser.

In the present embodiment, the sub-pixel unit 24 has a structure in which an isolation degree in the central portion of the parallax generating lens 40 is different from that in the peripheral portion. Here, the isolation degree indicates a ratio of a part overlapping an adjacent sub-pixel in the vertical direction to an area of the original sub-pixel.

Figure 2:
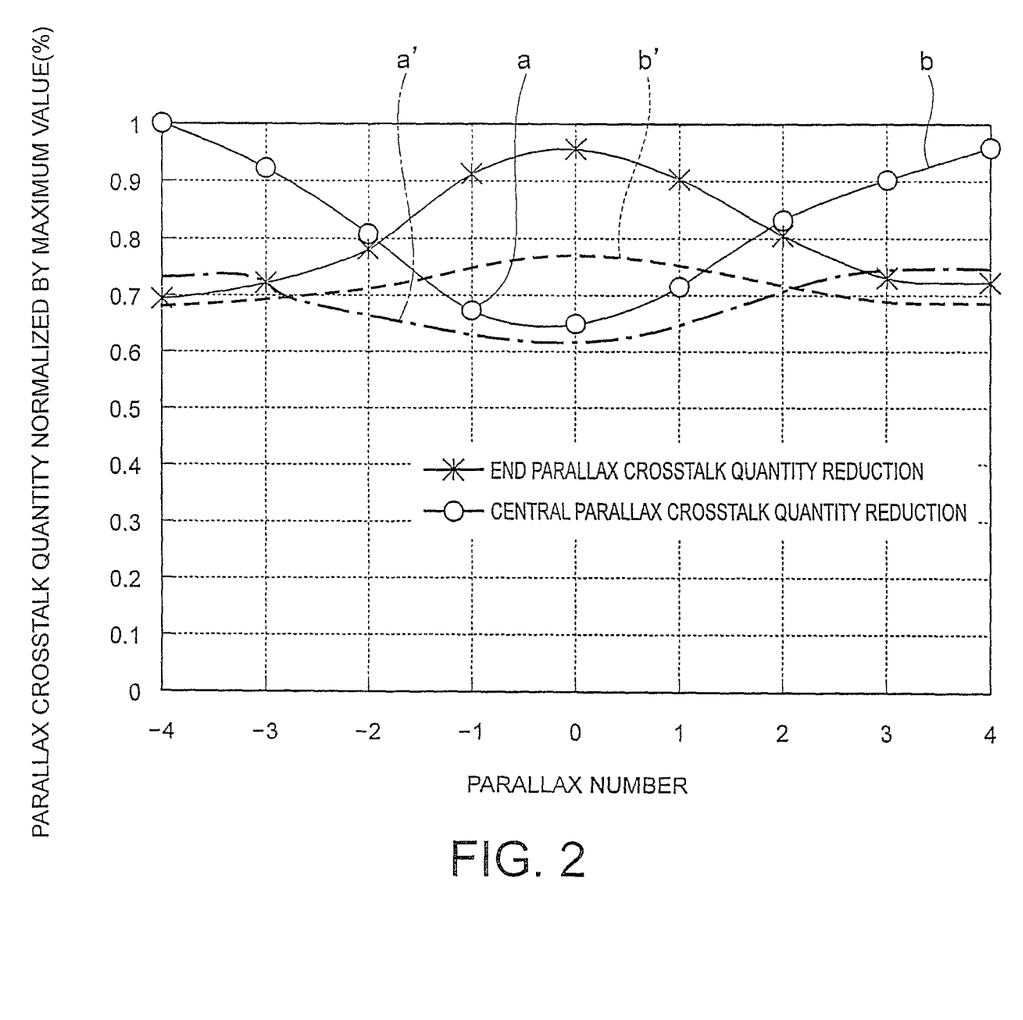
FIG. 2 is a diagram showing dependence of a parallax crosstalk quantity upon a parallax number in a stereoscopic image display apparatus according to a comparative example.

As a comparative example, a stereoscopic image display apparatus having the same configuration as that of the stereoscopic image display apparatus according to the present embodiment except that the isolation degree in the central portion of the parallax generating lens is the same as that in the peripheral portion will now be considered. Dependence of a parallax crosstalk quantity upon the parallax number in the stereoscopic image display apparatus according to the comparative example is shown in FIG. 2. In FIG. 2, the parallax crosstalk quantity is normalized by a maximum parallax crosstalk quantity. In the present specification, the parallax crosstalk quantity refers to a luminance ratio of an adjacent parallax to the main parallax which can be visually recognized at an arbitrary viewing distance. If in the case of an image a quantity of crossing of adjacent parallaxes exceeds an allowable value, then a double image or feeling of defocusing is brought about in some cases. A graph "a" in FIG. 2 indicates a lens design example in which the parallax crosstalk quantity of the central parallax (parallax in the lens central portion) is minimized. A graph "b" indicates a lens design example in which the parallax crosstalk quantity of the peripheral parallax (parallax in the lens peripheral portion) is minimized. In the case of the graph "a", the parallax crosstalk quantity of the peripheral parallax becomes greater than the parallax crosstalk quantity of the central parallax. In the case of the graph "b", the parallax crosstalk quantity of the central parallax becomes greater than the parallax crosstalk quantity of the peripheral parallax. This is because of the aberration characteristics of the lens. The parallax crosstalk quantity in the lens central portion and the parallax crosstalk quantity in the peripheral portion are in a relation of trade off. In FIG. 2, parallax number 0 corresponds to the lens central portion.

The graph a' and the graph b' respectively indicate improvement target examples of the graph "a" and the graph "b" in the lens design example in the comparative example in the stereoscopic image display apparatus according to the present embodiment.

Figure 3:
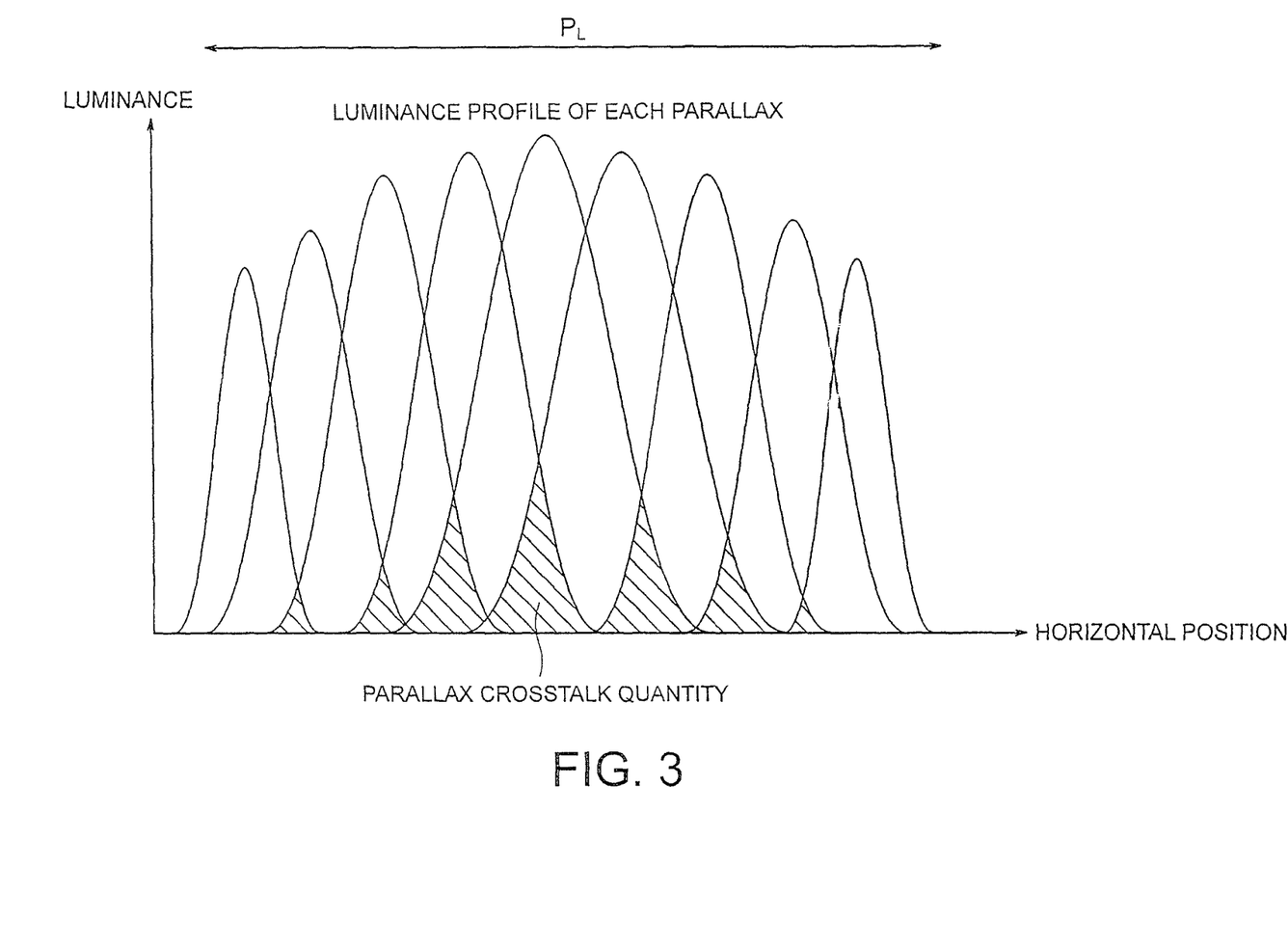
FIG. 3 is a diagram showing luminance distribution of light rays emitted from each sub-pixel.

Luminance distribution of light rays emitted from each sub-pixel in the lens pitch width in the stereoscopic image display apparatus according to the present embodiment is shown in FIG. 3. FIG. 3 schematically shows the case where the isolation degree of sub-pixels in 9 parallaxes differs depending upon whether the location is in the central portion of the lens or in the peripheral portion. A peak part of each parallax is a point where each parallax image is visually recognized with accuracy. A shaded area shown in FIG. 3 represents a parallax crosstalk quantity between adjacent parallaxes. As the isolation degree of sub-pixels becomes high, the parallax crosstalk quantity decreases.

A concrete example for obtaining a structure in which the isolation degree of sub-pixels differs depending upon whether the location is in the central portion of the parallax generating lens 40 or in the peripheral portion in the stereoscopic image display apparatus according to the present embodiment will now be described.

First Concrete Example

Figure 4:
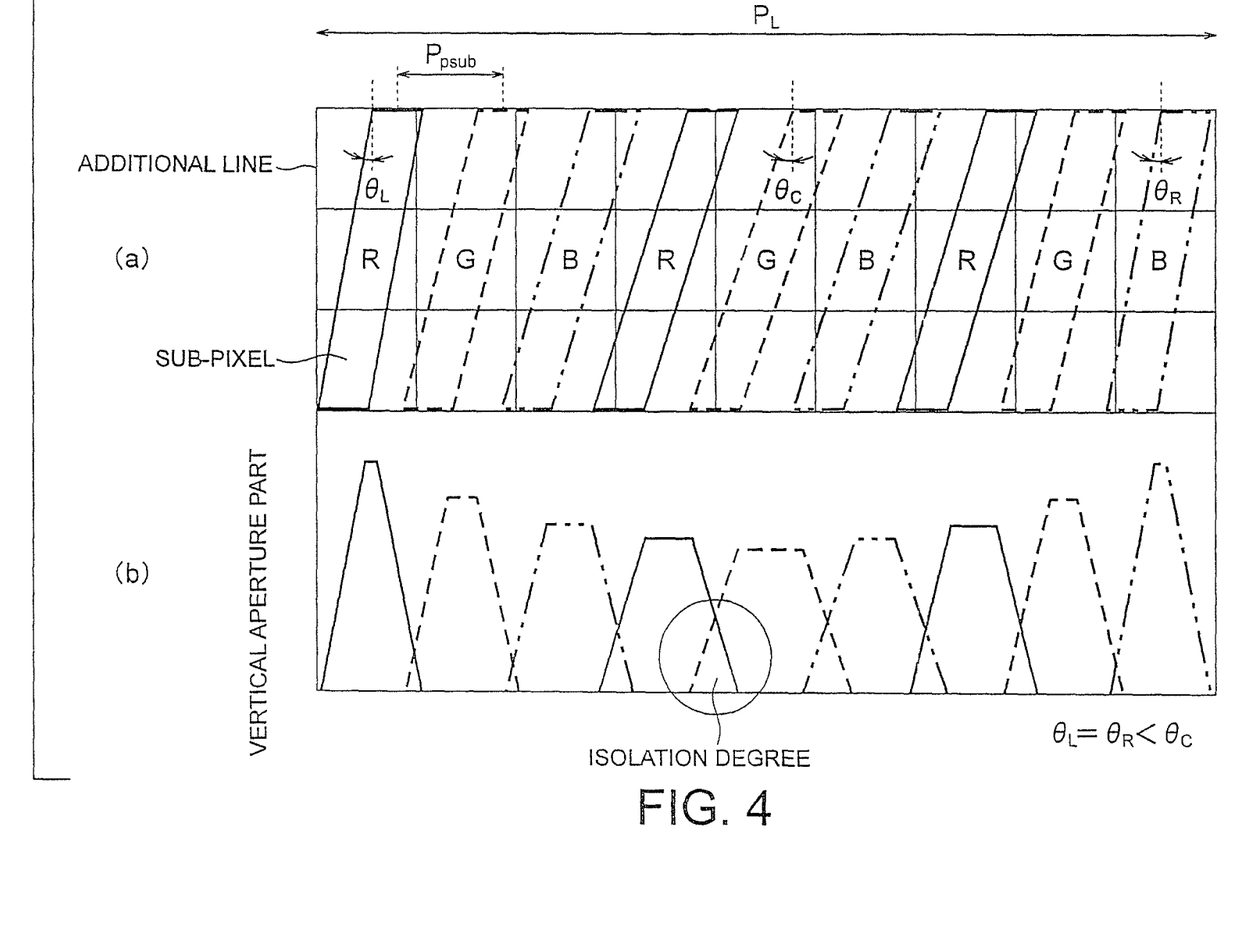
FIG. 4(a) is a diagram showing a pixel structure of a stereoscopic image display apparatus in a first concrete example.
FIG. 4(b) is a diagram obtained by plotting vertical aperture areas of respective pixels in the stereoscopic image display apparatus in the first concrete example.

A pixel structure in each lens in a stereoscopic image display apparatus according to a first concrete example is shown in FIG. 4(a). FIG. 4(b) is a diagram obtained by plotting vertical aperture areas of respective pixels in the stereoscopic image display apparatus according to the first concrete example having the pixel structure shown in. FIG. 4(a). Additional lines in FIG. 4(a) represent a one horizontal sub-pixel width and one third vertical sub-pixel width.

In the first concrete example and a second concrete example which will be described later, the sub-pixel takes a different shape depending upon whether the location is in the lens central portion or in the peripheral portion although the sub-pixel pitch $P_{psub}$ and an aperture ratio of sub-pixels are constant, in order to cause the isolation degree of the sub-pixels to differ depending upon whether the location is in the lens central portion or in the peripheral portion. In other words, the inclination of the sub-pixel differs depending upon whether the location is in the lens central portion or in the peripheral portion in order to change the isolation degree between adjacent sub-pixels when attention is paid to the vertical aperture ratio. Here, the isolation degree of the sub-pixel indicates a ratio of a part overlapping an adjacent sub-pixel in the vertical direction to an area of the original sub-pixel.

The first concrete example shown in FIG. 4(a) and FIG. 4(b) has a configuration in which the sub-pixel isolation degree in the lens central portion becomes greater than the sub-pixel isolation degree in the peripheral portion. As appreciated from FIG. 4(a), in the first concrete example, an inclination angle (inclination angle from the vertical direction) θ of the sub-pixel decreases as the location advances from the lens central portion to the peripheral portion. Denoting an inclination angle of a pixel in the lens central portion by $\theta_C$, an inclination angle of a pixel at the right end of the lens by $\theta_R$, and an inclination angle of a pixel at the left end of the lens by $\theta_L$, a pixel structure satisfying a relation $\theta_R=\theta_L<\theta_C$ is formed. In other words, in this case, a lens designed to minimize the condensing width at the central parallax position which is the sub-pixel position in the lens central portion is used. However, all aperture areas of sub-pixels in respective pixels are constant.

Second Concrete Example

Figure 5:
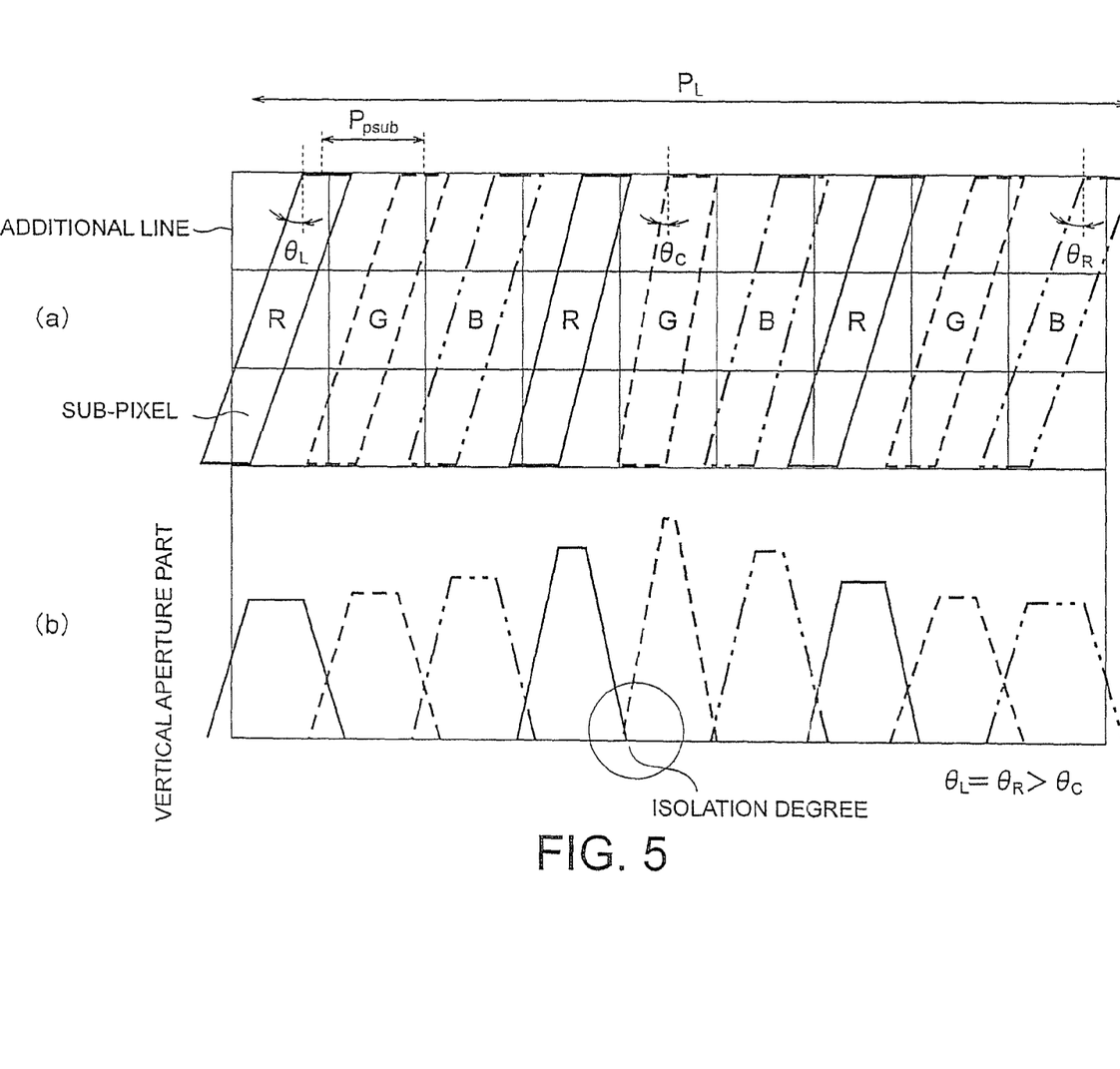
FIG. 5(a) is a diagram showing a pixel structure of a stereoscopic image display apparatus in a second concrete example.
FIG. 5(b) is a diagram obtained by plotting vertical aperture areas of respective pixels in the stereoscopic image display apparatus in the second concrete example.

A pixel structure in each lens in a stereoscopic image display apparatus according to a second concrete example is shown in FIG. 5(a). FIG. 5(b) is a diagram obtained by plotting vertical aperture areas of respective pixels in the stereoscopic image display apparatus according to the second concrete example having the pixel structure shown in FIG. 5(a). Additional lines in FIG. 5(a) represent a one horizontal sub-pixel width and one third vertical sub-pixel width.

The stereoscopic image display apparatus according to the second concrete example has a sub-pixel structure obtained when using a lens designed to minimize the parallax crosstalk quantity in the lens peripheral portion. The inclination of the sub-pixel increases as the location advances to the lens peripheral portion, and the isolation degree of the left and right pixels increases. Denoting an inclination angle of a pixel in the lens central portion by $\theta_C$, an inclination angle of a pixel at the right end of the lens by $\theta_R$, and an inclination angle of a pixel at the left end of the lens by $\theta_L$, a pixel structure satisfying a relation $\theta_R=\theta_L>\theta_C$ is formed.

Incidentally, in the first and second concrete examples, moiré 5 can be prevented by providing sub-pixels in an even numbered row in the vertical direction with shapes obtained by inverting shapes of sub-pixels in an odd numbered row about a horizontal axis, that is, by forming a pixel shape of one "<" character in two rows.

Third Concrete Example

Figure 6:
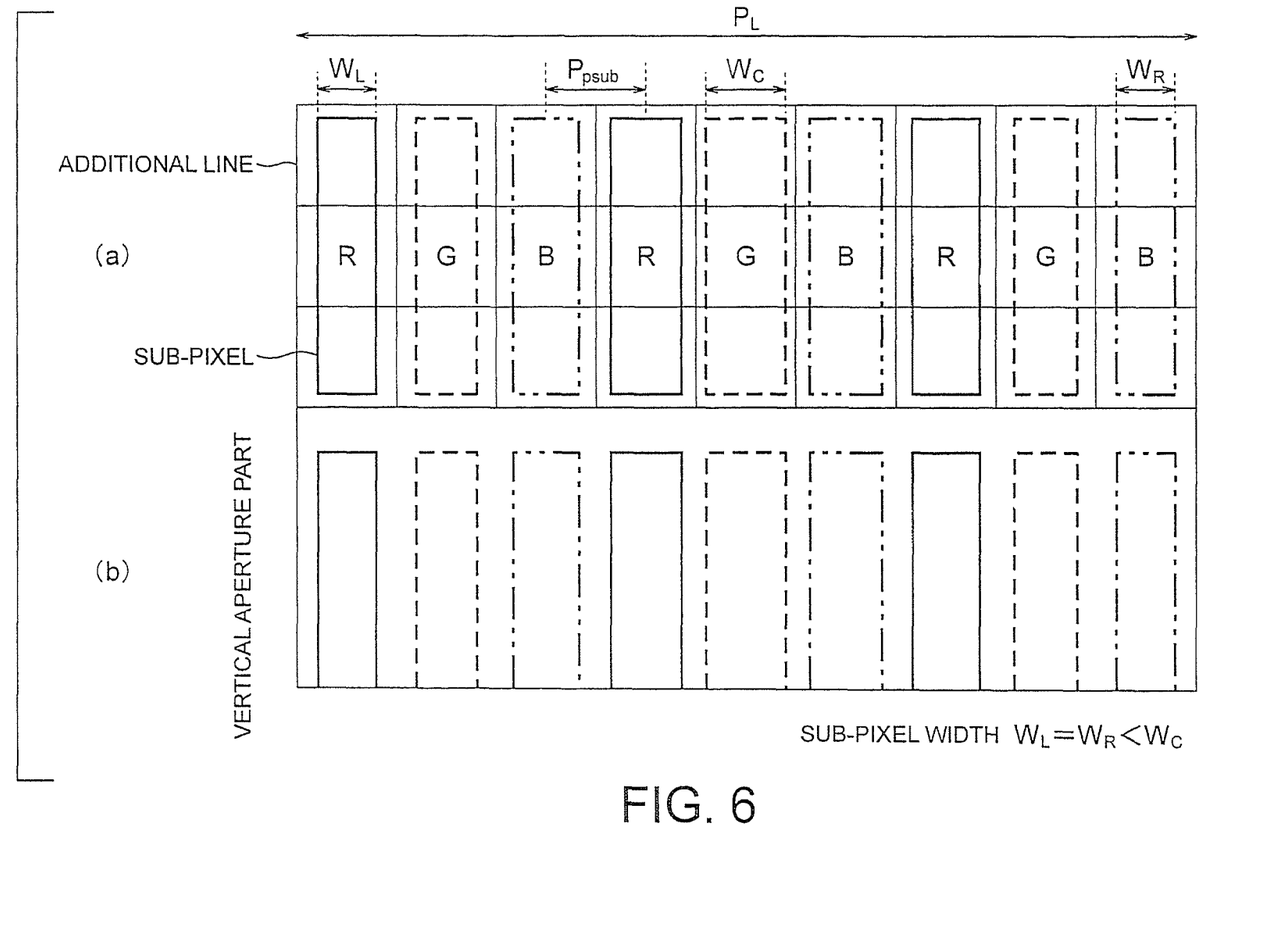
FIG. 6(a) is a diagram showing a pixel structure of a stereoscopic image display apparatus in a third concrete example.
FIG. 6(b) is a diagram obtained by plotting vertical aperture areas of respective pixels in the stereoscopic image display apparatus in the third concrete example.

A pixel structure in each lens in a stereoscopic image display apparatus according to a third concrete example is shown in FIG. 6(a). FIG. 6(b) is a diagram obtained by plotting vertical aperture areas of respective pixels in the stereoscopic image display apparatus according to the third concrete example having the pixel structure shown in FIG. 6(a). Additional lines in FIG. 6(a) represent a one horizontal sub-pixel width and one third vertical sub-pixel width.

In the third concrete example and a fourth concrete example which will be described later, the parallax crosstalk quantity in luminance distribution of light rays illuminated from each sub-pixel changes depending upon the width of the black matrix, that is, the horizontal aperture ratio of the sub-pixel. The stereoscopic image display apparatus according to the third concrete example shown in FIGS. 6(a) and 6(b) has a pixel shape in the case where a lens designed to minimize the condensing width of parallax in the lens central portion is used. The horizontal aperture width of a sub-pixel located in the lens central portion is wide, and the horizontal aperture width decreases as the location advances to the peripheral portion. Denoting a horizontal aperture width in the lens central portion by $W_C$, a horizontal aperture width at the lens left end by $W_L$, and a horizontal aperture width at the lens right end by $W_R$, the pixel structure satisfies a relation $W_L=W_R<W_C$.

Fourth Concrete Example

Figure 7:
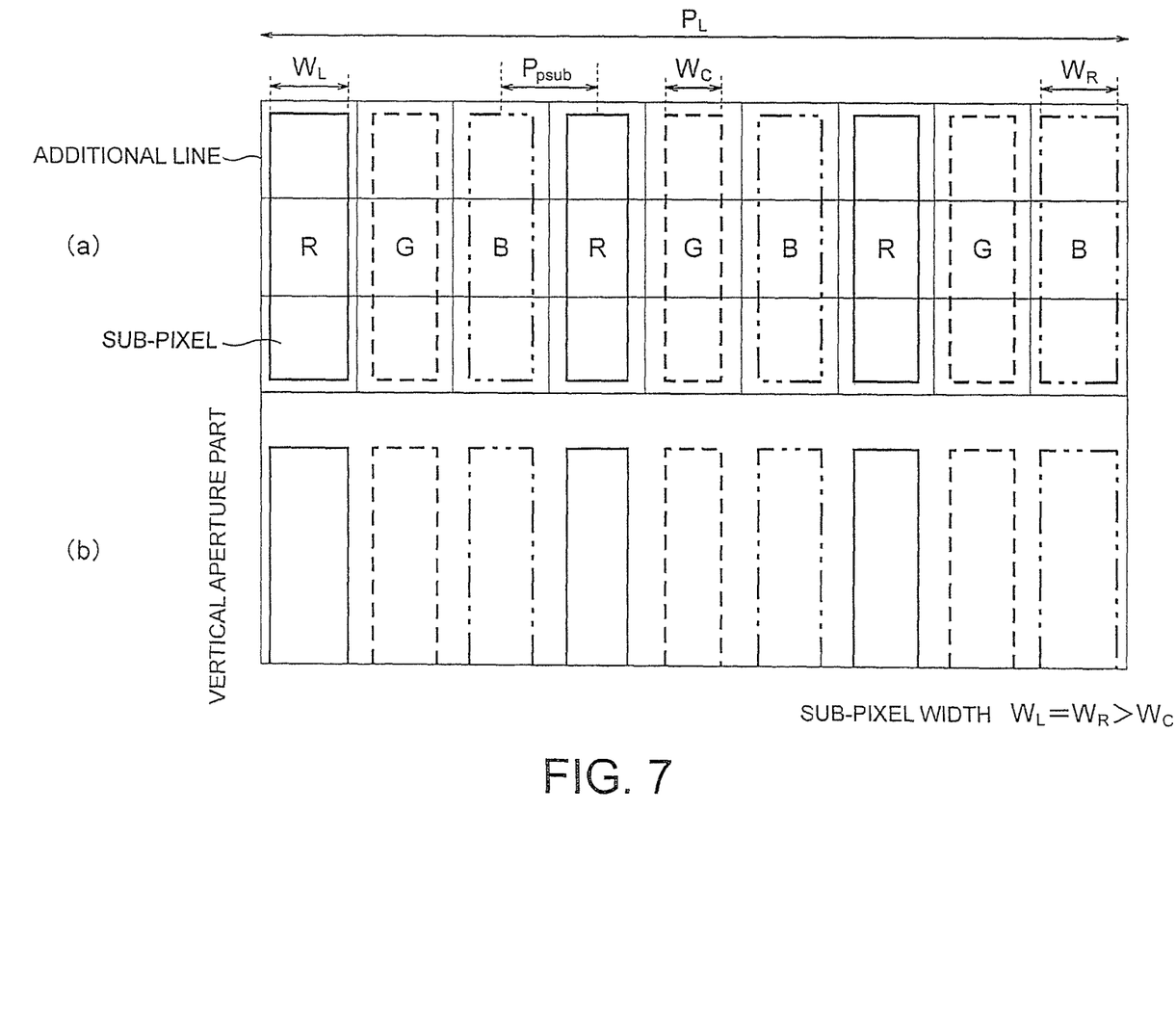
FIG. 7(a) is a diagram showing a pixel structure of a stereoscopic image display apparatus in a fourth concrete example.
FIG. 7(b) is a diagram obtained by plotting vertical aperture areas of respective pixels in the stereoscopic image display apparatus in the fourth concrete example.

A pixel structure in each lens in a stereoscopic image display apparatus according to a fourth concrete example is shown in FIG. 7(a). FIG. 7(b) is a diagram obtained by plotting vertical aperture areas of respective pixels in the stereoscopic image display apparatus according to the fourth concrete example having the pixel structure shown in FIG. 7(a). Additional lines in FIG. 7(a) represent a one horizontal sub-pixel width and one third vertical sub-pixel width.

The stereoscopic image display apparatus according to the fourth concrete example has a pixel shape in the case where a lens designed to minimize the condensing width of the peripheral parallax is used. As shown in FIGS. 7(a) and 7(b), the horizontal aperture ratio of the sub-pixel increases as the location advances from the lens central portion to the peripheral portion. In other words, the horizontal aperture width of the sub-pixel located in the lens central portion is narrow, and the horizontal aperture width increases as the location advances to the peripheral portion.

Denoting a horizontal aperture width in the lens central portion by $W_C$, a horizontal aperture width at the lens left end by $W_L$, and a horizontal aperture width at the lens right end by $W_R$, the pixel structure satisfies a relation $W_L=W_R>W_C$.

Figure 8:
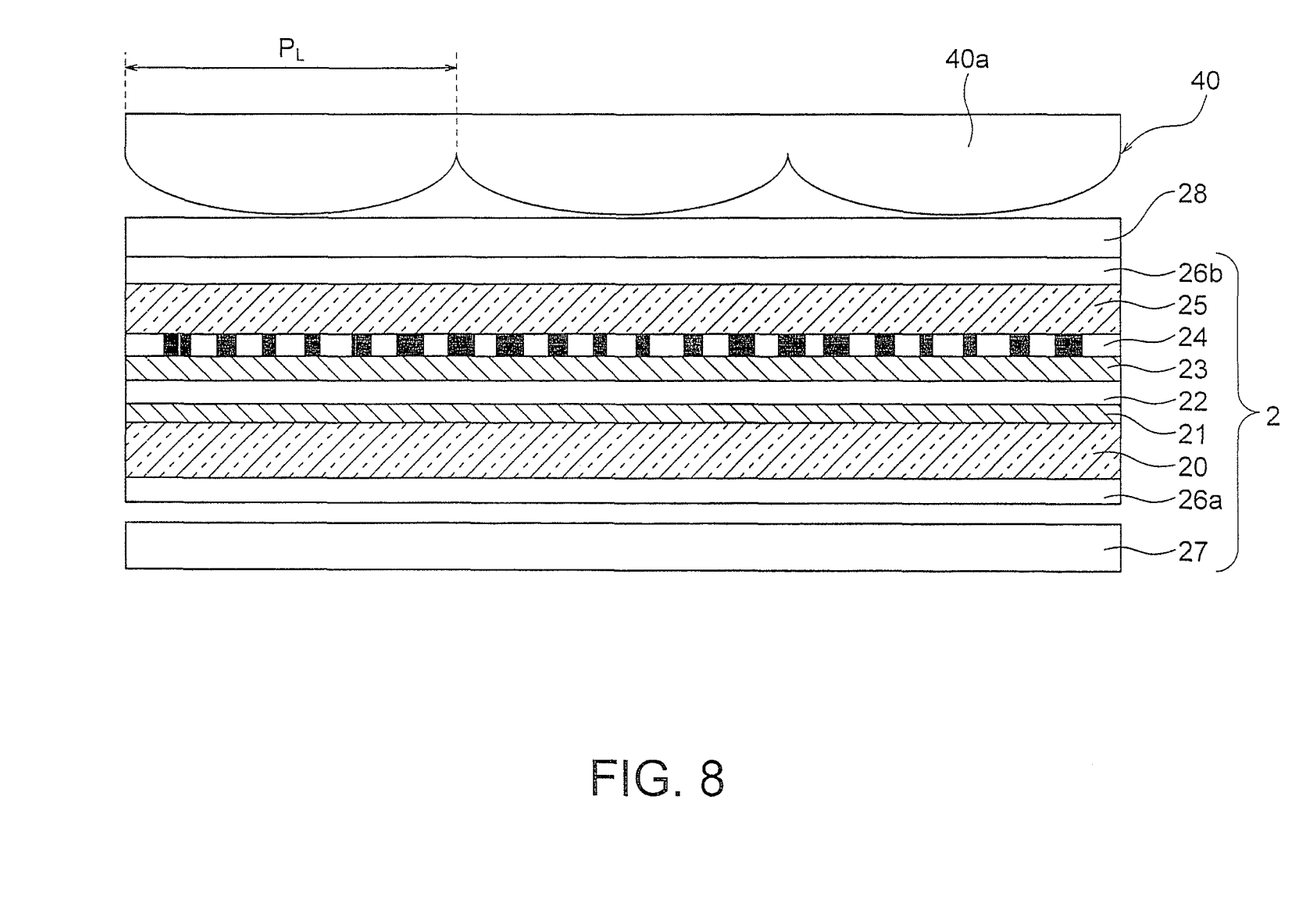
FIG. 8 is a horizontal section view showing a configuration for preventing moiré 5 in the third and fourth concrete examples.

Incidentally, in the third and fourth concrete examples, a diffusion film 28 should be provided between the second sheet polarizer 26b and the parallax generating lens 40 as shown in FIG. 8 in order to eliminate moiré 5 in which the luminance varies periodically caused by the black matrix of the sub-pixel resulting from the lens effect.

Figure 9:
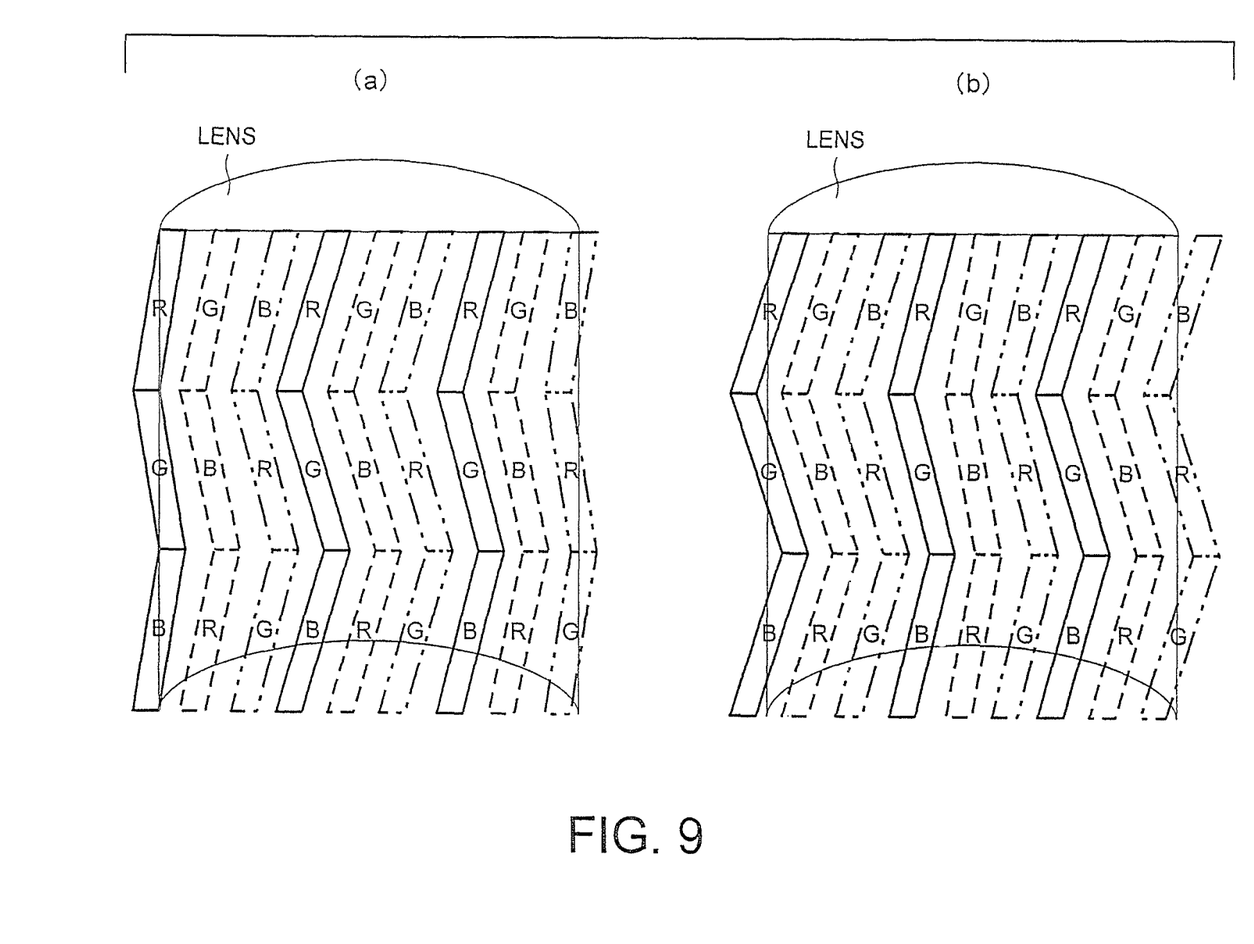
FIGS. 9(a) and 9(b) are diagrams showing relations between a color filter arrangement (sub-pixel arrangement) and lens inclination angles.
Figure 10:
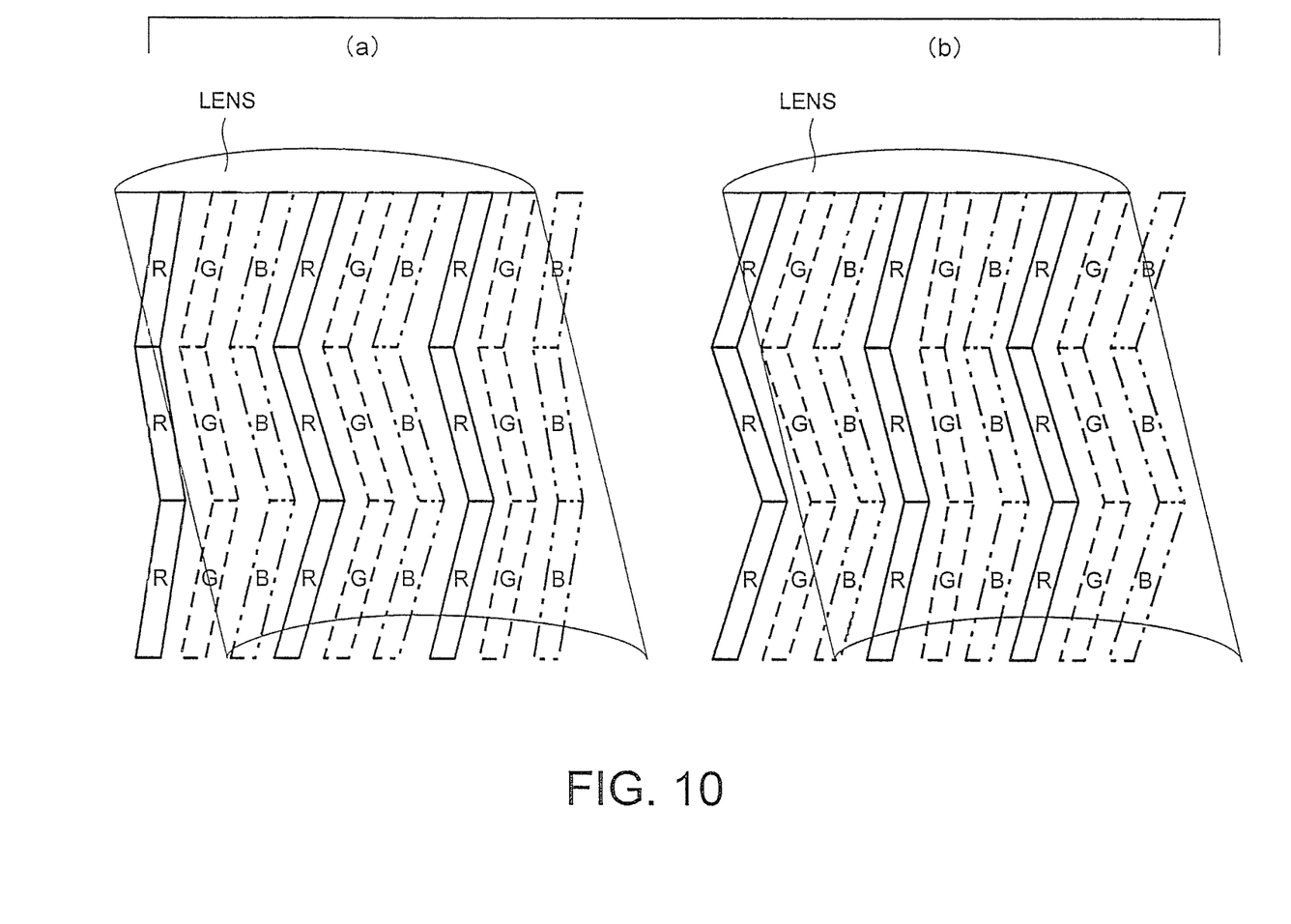
FIGS. 10(a) and 10(b) are diagrams showing relations between a color filter arrangement (sub-pixel arrangement) and lens inclination angles.

Relations among inclination angles of the color filter arrangement (sub-pixel arrangement) with respect to a ridge-line (major axis) of the lens will now be described with reference to FIGS. 9(a) to 10(b). In the case of a pixel shape in which the inclination angle of the pixel differs depending upon the location is in the lens central portion or in the peripheral portion as described above, it will be indicated that the inclination angle of the lens also has a general purpose property. FIGS. 9(a) and 9(b) show examples of a mosaic arrangement in which R, G and B pixels forming color filters are arranged alternately both in the horizontal direction and the vertical direction. And FIGS. 9(a) and 9(b) show examples in the case where sub-pixels have pixel shapes shown in FIG. 4(a) and FIG. 5(a), respectively. In this case, a vertical lens having a ridge line direction of the lens which is vertical is used. Although FIGS. 9(a) and 9(b) show the examples of the mosaic arrangement, a lateral stripe arrangement in which R, G and B are arranged in the same way may also be used.

FIGS. 10(a) and 10(b) show examples using a stripe arrangement in which the same colors are arranged in the vertical direction. And FIGS. 10(a) and 10(b) show examples in the case where sub-pixels have pixel shapes shown in FIG. 4(a) and FIG. 5(a), respectively. In the examples shown in FIGS. 10(a) and 10(b), an oblique lens in which the lens ridgeline direction has an inclination depending upon the number of parallaxes is used. It is possible to conduct color display with resolution lowering suppressed and parallax crosstalk quantity suppressed.

Incidentally, in FIGS. 9(a) to 10(b), moiré 5 can be prevented by providing sub-pixels in an even numbered row in the vertical direction with shapes obtained by inverting shapes of sub-pixels in an odd numbered row about a horizontal axis, that is, by forming a pixel shape of one "<" character in two rows.

Figure 11:
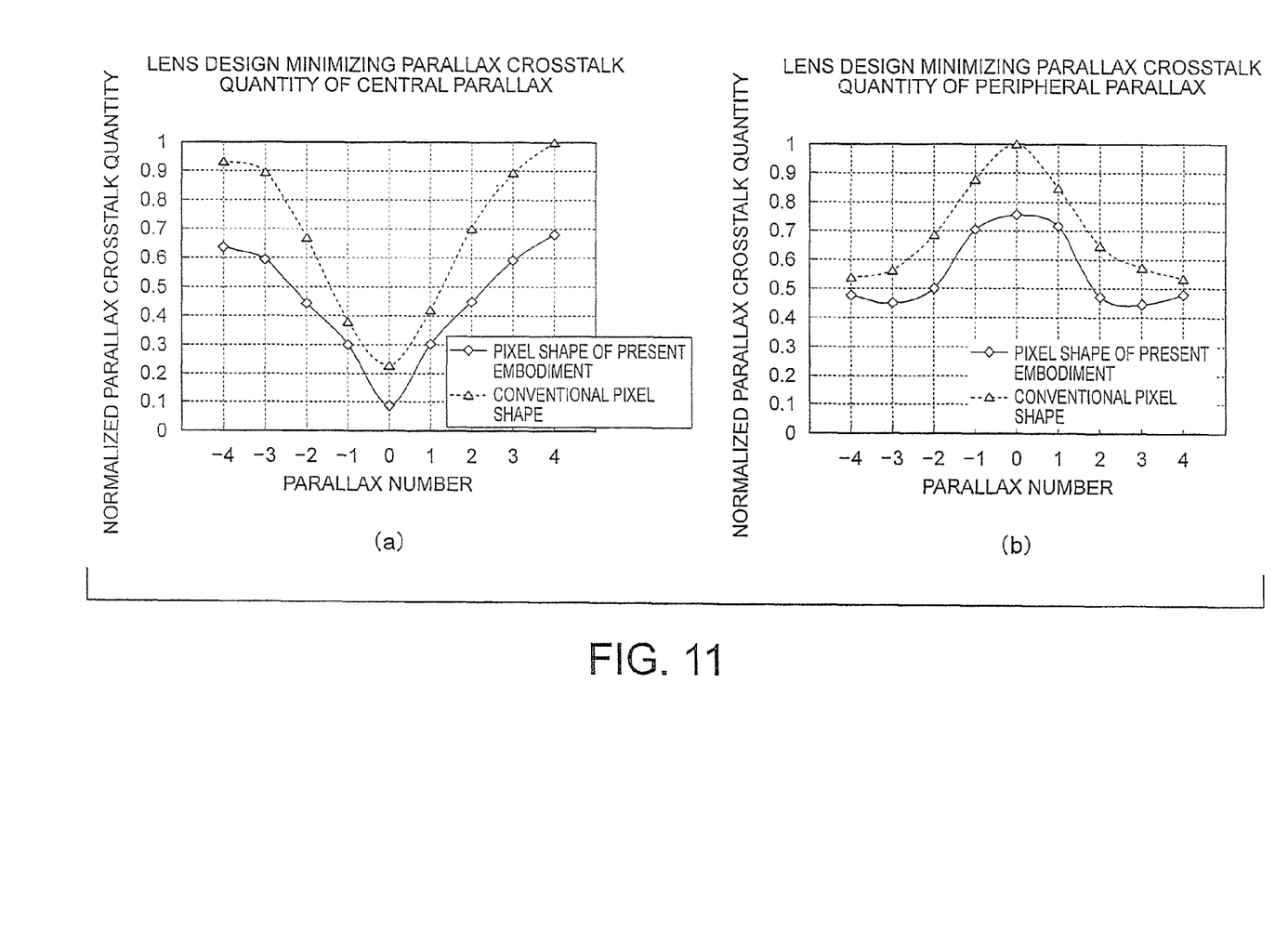
FIG. 11(a) is a diagram showing a result obtained by conducting simulation of a parallax crosstalk quantity in nine parallaxes by using a sub-pixel shape shown in FIG. 4(a)
FIG. 11(b) is a diagram showing a result obtained by conducting simulation of a parallax crosstalk quantity in nine parallaxes by using a sub-pixel shape shown in FIG. 5(a).

FIGS. 11(a) and 11(b) are diagrams showing results obtained by conducting a simulation of the parallax crosstalk quantity in nine parallaxes with sub-pixel shapes shown in FIG. 4(a) and FIG. 5(a). Normalized parallax crosstalk for each parallax number is shown. Triangular points indicate the conventional case in which all pixel structures are the same. Rhomb points indicate results obtained by using pixel shapes in the present embodiment. In the case of FIG. 11(a), the lens is designed to minimize the parallax crosstalk quantity of the central parallax, and consequently the pixel shape in which the inclination angle of the sub-pixel becomes great as the location approaches the central portion of the lens is used. Since the isolation degree of the sub-pixel in the lens peripheral portion is high, the parallax crosstalk quantity of luminance is improved by at least 10% as compared with the conventional case. In the case of FIG. 11(b), the lens is designed to minimize the parallax crosstalk quantity of the peripheral parallax, and consequently the pixel shape in which the inclination angle of the sub-pixel becomes small as the location approaches the central portion of the lens is used. In this case, the parallax crosstalk quantity is improved by at least 7% as compared with the conventional case. It should be noted that the improved parallax crosstalk quantity differs according to a change of panel specifications such as the pixel shape and the sub-pixel width. However, it is apparent that the pixel shape in the present embodiment brings about a great effect in reduction of the parallax crosstalk quantity as compared with the conventional pixel shape.

According to the present embodiment, the difference in parallax crosstalk quantity can be reduced as described heretofore.

While certain embodiments have been described, these embodiments have been presented by way of example only, and are not intended to limit the scope of the inventions. Indeed, the novel methods and systems described herein can be embodied in a variety of other forms; furthermore, various omissions, substitutions and changes in the form of the methods and systems described herein can be made without departing from the spirit of the inventions. The accompanying claims and their equivalents are intended to cover such forms or modifications as would fall within the scope and spirit of the inventions.

What is claimed is:

1. A stereoscopic image display apparatus comprising:
    an elemental image display unit having a display face in which pixels having sub-pixels are arranged in a matrix form, the display face being divided into a plurality of elemental images for display; and
    an optical plate provided opposed to the elemental image display unit, the optical plate having a plurality of lenses arranged periodically along a horizontal direction of the elemental image display unit, the plurality of lenses extending to a vertical direction perpendicular to the horizontal direction, each of the lenses controlling light rays from the pixels,
    wherein the sub-pixels have isolation degrees that, with respect to first ones of the sub-pixels, indicate ratios of areas of overlapping portions of adjacent ones of the sub-pixels in the vertical direction to areas of first ones of the sub-pixels, and an isolation degree of at least one of the first ones of the sub-pixels, located in a central portion of one of the lenses, differs from an isolation degree of at least a second one of the first ones of the sub-pixels located in a peripheral portion of the one of the lenses, and
    wherein an inclination angle from the vertical direction of the one of the sub-pixels in the central portion of the one of the lenses differs from an inclination angle from the vertical direction of the one of the sub-pixels in the peripheral portion of the one of the lenses.

2. The apparatus according to claim 1, wherein the sub-pixels which display the elemental image associated with each lens are arranged at equal intervals, are nearly uniform in aperture ratio, and are different in shape depending upon whether the location is in a central portion of each lens or in a peripheral portion of the lens.

3. The apparatus according to claim 2, wherein
    each of the pixels comprises an R sub-pixel, a G sub-pixel, and a B sub-pixel; and
    the sub-pixels have one of the following arrangements:
        the R sub-pixel, the G sub-pixel, and the B sub-pixel are arranged alternately in the horizontal direction and the vertical direction, or
        the R sub-pixel, the G sub-pixel, and the B sub-pixel are arranged alternately in the vertical direction and the sub-pixels having the same color are arranged in the horizontal direction.

* * * * *